June 30, 1936. J. C. MARSALA 2,045,863
ILLUMINATED LOCKED LICENSE PLATE CONTAINER
Filed March 25, 1935
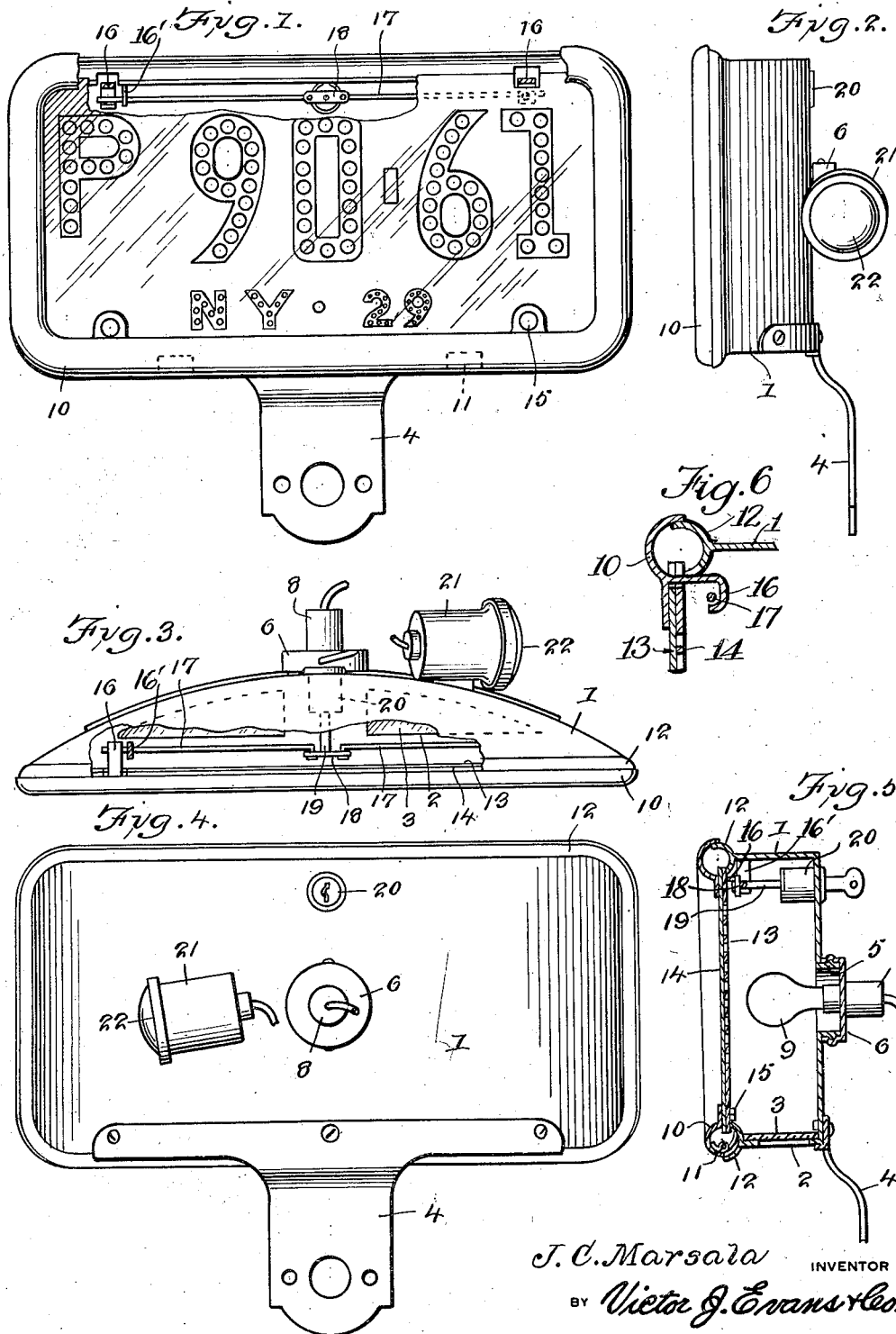
J. C. Marsala INVENTOR
BY Victor J. Evans & Co.
ATTORNEY Patented June 30, 1936

2,045,863

UNITED STATES PATENT OFFICE 2,045,863

ILLUMINATED LOCKED LICENSE PLATE CONTAINER

Joseph Charles Marsala, Watertown, N. Y.

Application March 25, 1935, Serial No. 12,948

1 Claim. (Cl. 40—133)

This invention relates to motor vehicle license plate holders and has for the primary object the provision of a device of this character which will materially reduce theft of license plates and will efficiently illuminate the characters of the license plate so that the characters may be read from a maximum distance at night.

Another object of this invention is the provision of means for illuminating the roadway to one side of the vehicle and directly below said vehicle so that distances between vehicles when passing one another may be readily determined.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation, partly broken away, illustrating a motor vehicle license plate holder constructed in accordance with my invention.

Figure 2 is an end view illustrating the same.

Figure 3 is a top plan view, partly broken away, illustrating the device.

Figure 4 is a rear elevation, partly in section, illustrating the device.

Figure 5 is a transverse sectional view illustrating the device.

Figure 6 is a detail sectional view showing one of the keepers secured to the frame of the device.

Referring in detail to the drawing, the numeral 1 indicates a casing of any suitable design having the front thereof open and also provided in the bottom wall with openings 2 closed by transparent panels 3. Secured to the casing is an attaching bracket 4 for securing said casing to a motor vehicle.

The rear wall of the casing has a collar 5 integral therewith closed by a removable cap 6 forming a mounting for an electric lamp socket 8. The socket 8 supports an electric lamp 9 within the casing and by the cap 6 being removable from the collar 5 will permit the removal and replacement of the electric lamp without opening of the front of the casing.

A frame 10 is hinged to the casing, as shown at 11, and cooperates with semi-cylindrical portions 12 of the casing in supporting a stenciled license plate 13, also a transparent panel 14 which is positioned in front of the license plate. The frame 10 has a semicylindrical shape cooperating with the semicylindrical portion 12 of the casing in supporting the license plate 13 and the panel 14. The frame is equipped with fasteners 15 which secure the panel 14 and the license plate to the frame.

Keepers 16 are suitably secured to the frame and are slidably engaged by securing rods 17 slidably mounted to the casing as shown at 16'. The securing rods are pivotally connected to ends of a rotatable plate-like element 18 forming a part of a stem 19 secured to a key actuated lock 20. The lock 20 is mounted to the casing and is operable by a key from the exterior of said casing for the purpose of engaging and disengaging the securing rods with the keepers 16. The turning of the plate-like element in one direction will slide the rods into the keepers and the turning of the plate-like element in an opposite direction will withdraw the rods from said keepers. The characters of the license plate are formed therein by stenciling so that the light rays from the electric lamp may pass through the characters rendering them visible at nighttime for a maximum distance. The light rays from the lamp also may pass through the panels 3 for illuminating the ground directly below the automobile.

A lamp housing 21 is mounted to the rear wall of the casing 1 and the lens 22 thereof is removable to permit an electric lamp to be mounted in said housing. The electric lamp of the housing 21 casts light rays laterally of the front of the casing 1 so that one side of the roadway will be illuminated, preferably the left-hand side of the roadway with respect to the vehicle. This arrangement will materially aid other vehicles in passing and eliminate the danger of sideswiping between vehicles.

The roadway being illuminated directly under the license plate holder will give approaching drivers an opportunity to determine the width of the vehicle.

Having described the invention, I claim:

A license plate holder comprising a casing having the interior thereof illuminated and provided with an open front, marginal flanges formed on the open front of the casing and of arcuate shape in cross section providing inner and outer edges, a frame, marginal flanges formed on the frame and of arcuate shape in cross section providing inner and outer edges, hinges connecting the frame to the casing and lying within the flanges of the frame and casing, said outer edges of the flanges of said frame adapted to overlap the outer edges of the flanges of the casing and the inner edges of the flanges of the frame aligned with the inner edges of the flanges of the casing to receive therebetween a license plate, hook-shaped keepers formed on the flanges of the frame and adapted to enter the casing, rods slidably secured to the casing for movement into and out of the keepers, and means for sliding and rocking said rods and carried by the casing.

JOSEPH CHARLES MARSALA.